United States Patent
Narayanan et al.

(10) Patent No.: US 12,311,555 B2
(45) Date of Patent: May 27, 2025

(54) ROBOTIC NAVIGATION AND TRANSPORT OF OBJECTS

(71) Applicant: NEC Laboratories America, Inc., Princeton, NJ (US)

(72) Inventors: Sriram Nochur Narayanan, San Jose, CA (US); Ramin Moslemi, Pleasanton, CA (US); Junha Roh, San Francisco, CA (US)

(73) Assignee: NEC Corporation, Tokyo (JP)

( * ) Notice: Subject to any disclaimer, the term of this patent is extended or adjusted under 35 U.S.C. 154(b) by 251 days.

(21) Appl. No.: 17/969,100

(22) Filed: Oct. 19, 2022

(65) Prior Publication Data

US 2023/0132280 A1 Apr. 27, 2023

Related U.S. Application Data

(60) Provisional application No. 63/270,615, filed on Oct. 22, 2021, provisional application No. 63/279,328, filed on Nov. 15, 2021.

(51) Int. Cl.
*B25J 9/16* (2006.01)

(52) U.S. Cl.
CPC .................. *B25J 9/1666* (2013.01)

(58) Field of Classification Search
CPC .... B25J 9/1666; G01C 21/206; G01C 21/383; G05D 1/0221; G05D 1/0274
See application file for complete search history.

(56) References Cited

U.S. PATENT DOCUMENTS

| | | | |
|---|---|---|---|
| 11,199,853 B1* | 12/2021 | Afrouzi | B25J 13/006 |
| 2011/0035051 A1* | 2/2011 | Kim | B25J 9/1666 |
| | | | 901/1 |
| 2019/0025851 A1 | 1/2019 | Ebrahimi Afrouzi | |
| 2019/0120633 A1* | 4/2019 | Afrouzi | G05D 1/0219 |
| 2019/0133396 A1* | 5/2019 | Lim | G05D 1/0246 |
| 2019/0133397 A1* | 5/2019 | Choe | B25J 9/16 |
| 2020/0114924 A1* | 4/2020 | Chen | B60W 40/09 |
| 2021/0004012 A1* | 1/2021 | Marchetti-Bowick | |
| | | | G05D 1/0221 |
| 2022/0026920 A1* | 1/2022 | Ebrahimi Afrouzi | G06N 7/01 |

(Continued)

FOREIGN PATENT DOCUMENTS

| | | | | |
|---|---|---|---|---|
| CN | 110632931 A | * | 12/2019 | ........... G05D 1/0214 |
| JP | 2005032196 A | * | 2/2005 | ........... G05D 1/0217 |

(Continued)

OTHER PUBLICATIONS

JP-2005032196-A translation (Year: 2005).*

(Continued)

*Primary Examiner* — Kyle T Johnson
(74) *Attorney, Agent, or Firm* — Joseph Kolodka

(57) ABSTRACT

Navigational systems and methods include building a topological graph of an environment using nodes that represent locations in the space and associated directions, with frontiers associated with particular nodes and directions within the topological graph. An action is determined using a policy trained with an action reward function that weighs exploration to find new objects and moving objects to a goal. An agent navigates within the environment in accordance with the determined action.

20 Claims, 7 Drawing Sheets

(56) References Cited

U.S. PATENT DOCUMENTS

2023/0132280 A1* 4/2023 Narayanan ........... G05D 1/0274 700/255

FOREIGN PATENT DOCUMENTS

WO    WO-2019219969 A1 * 11/2019 ........... G06N 3/0445
WO    WO-2021080507 A1 * 4/2021

OTHER PUBLICATIONS

CN-110632931-A translation (Year: 2019).*
Improving_object_detection_with_deep_convolutional_networks (Year: 2015).*
Anderson et al., "On Evaluation of Embodied Navigation Agents", arXiv:1807.06757v1 [cs.AI] Jul. 18, 2018, pp. 1-7.
Anderson et al., "Vision-and-Language Navigation: Interpreting visually-grounded navigation instructions in real environments", in Proceedings of the IEEE conference on computer vision and pattern recognition 2018, Jun. 2018, pp. 3674-3683.
Bacon et al., "The Option-Critic Architecture", in Proceedings of the AAAI Conference on Artificial Intelligence Feb. 13, 2017, vol. 31, No. 1, pp. 1-9.
Batra et al., "ObjectNav Revisited: On Evaluation of Embodied Agents Navigating to Objects", arXiv:2006.13171v2 [cs.CV] Aug. 30, 2020, pp. 1-9.
Chang et al., "Matterport3D: Learning from RGB-D Data in Indoor Environments", arXiv:1709.06158v1 [cs.CV] Sep. 18, 2017, pp. 1-25.
Chaplot et al., "Object Goal Navigation using Goal-Oriented Semantic Exploration", arXiv:2007.00643v2 [cs.CV] Jul. 2, 2020, pp. 1-11.
Chaplot et al., "Neural Topological SLAM for Visual Navigation", in Proceedings of the IEEE/CVF Conference on Computer Vision and Pattern Recognition 2020, Jun. 2020, p. 12875-12884.
Chen et al., "SoundSpaces: Audio-Visual Navigation in 3D Environments", arXiv:1912.11474v3 [cs.CV] Aug. 21, 2020, pp. 1-27.
Das et al., "Embodied Question Answering", arXiv:1711.11543v2 [cs.CV] Dec. 1, 2017, pp. 1-20.
Das et al., "Neural Modular Control for Embodied Question Answering", in Conference on Robot Learning Oct. 23, 2018, pp. 53-62.
Deitke et al., "RoboTHOR: An Open Simulation-to-Real Embodied AI Platform", arXiv:2004.06799v1 [cs.CV] Apr. 14, 2020, pp. 1-11.
Fang et al., "Scene Memory Transformer for Embodied Agents in Long-Horizon Tasks", in Proceedings of the IEEE/CVF Conference on Computer Vision and Pattern Recognition 2019, Jun. 2019, pp. 538-547.
Gan et al., "The threedworld transport challenge: A visually guided task-and-motion planning benchmark for physically realistic embodied ai", arXiv:2103.14025v1 [cs.CV] Mar. 25, 2021, pp. 1-12.
Garrett et al., "Integrated task and motion planning", arXiv:2010.01083v1 [cs.RO] Oct. 2, 2020, pp. 1-30.
Garrett et al., "Ffrob: Leveraging symbolic planning for efficient task and motion planning", The International Journal of Robotics Research, Nov. 2017, pp. 104-136.
Gupta et al., "Cognitive mapping and planning for visual navigation", in Proceedings of the IEEE conference on computer vision and pattern recognition 2017, Jul. 2017, pp. 2616-2625.
Jain et al., "A cordial sync: Going beyond marginal policies for multi-agent embodied tasks", in European Conference on Computer Vision Aug. 23, 2020, pp. 471-490.
Kipf et al., "Semi-supervised classification with graph convolutional networks", in International Conference on Learning Representations (ICLR), Apr. 2017, pp. 1-22.
Kolve et al., "AI2-THOR: An Interactive 3D Environment for Visual AI", arXiv:1712.05474v4 [cs.CV] Aug. 26, 2022, pp. 1-12.
Krantz et al., "Waypoint Models for Instruction-guided Navigation in Continuous Environments", in Proceedings of the IEEE/CVF International Conference on Computer Vision (ICCV), Oct. 2021, pp. 1-10.
LaValle, "Planning Algorithms", Cambridge university press, May 29, 2006, pp. 1-1007.
Marza et al., "Teaching agents how to map: Spatial reasoning for multi-object navigation", arXiv:2107.06011v3 [cs.CV] May 27, 2022, pp. 1-8.
McGovern et al., "Automatic discovery of subgoals in reinforcement learning using diverse density", in Proceedings of the Eighteenth International Conference on Machine Learning, Jun. 2001, p. 361-368.
Oh et al., "Control of memory, active perception, and action in minecraft", in International conference on machine learning, Jun. 11, 2016, pp. 2790-2799.
Parr et al., "Reinforcement learning with hierarchies of machines", in Advances in Neural Information Processing Systems, vol. 10, MIT Press, Jul. 1998, pp. 1-7.
Ramakrishnan et al., "Occupancy anticipation for efficient exploration and navigation", in European Conference on Computer Vision Aug. 23, 2020, pp. 400-418.
Savva et al., "Habitat: A platform for embodied ai research", in Proceedings of the IEEE/CVF International Conference on Computer Vision, (ICCV), Oct. 2019, pp. 1-9.
Schulman et al., "Proximal policy optimization algorithms", arXiv:1707.06347v2 [cs.LG] Aug. 28, 2017. pp 1-12.
Shen et al., "iGibson 1.0: A Simulation Environment for Interactive Tasks in Large Realistic Scenes", arXiv:2012.02924v6 [cs.AI] Aug. 10, 2021, pp. 1-11.
Shridhar et al., "Alfred: A benchmark for interpreting grounded instructions for everyday tasks", arXiv:1912.01734v2 [cs.CV] Mar. 31, 2020, pp. 1-18.
Sutton et al., "Between MDPs and semi-MDPs: A framework for temporal abstraction in reinforcement learning", Artificial Intelligence 112, Dec. 1998, pp. 181-211.
Szot et al., "Habitat 2.0: Training home assistants to rearrange their habitat", Advances in Neural Information Processing Systems, Dec. 6, 2021, pp. 1-16.
Wani et al., "Multion: Benchmarking semantic map memory using multi-object navigation" Advances in Neural Information Processing Systems 33, Dec. 2020, pp. 1-13.
Weihs et al., "Visual room rearrangement", in Proceedings of the IEEE/CVF Conference on Computer Vision and Pattern Recognition (CVPR), Jun. 2021, pp. 5922-5931.
Wijmans et al., "Dd-ppo: Learning near-perfect pointgoal navigators from 2.5 billion frames", arXiv:1911.00357v2 [cs.CV] Jan. 20, 2020, pp. 1-21.
Wortsman et al., "Learning to learn how to learn: Self-adaptive visual navigation using meta-learning", in Proceedings of the IEEE/CVF conference on computer vision and pattern recognition, Jun. 2019, pp. 6750-6759.
Xia et al., "Relmogen: Leveraging motion generation in reinforcement learning for mobile manipulation" arXiv:2008.07792v2 [cs.AI], Mar. 26, 2021, pp. 1-16.
Xia et al., "Gibson Env: realworld perception for embodied agents" in Proceedings of the IEEE Conference on Computer Vision and Pattern Recognition (CVPR), Jun. 2018, pp. 9068-9079.
Yamada et al., "Motion planner augmented reinforcement learning for robot manipulation in obstructed environments", arXiv:2010.11940v1 [cs.RO] Oct. 22, 2020, pp. 1-15.
Yamauchi, "A frontier-based approach for autonomous exploration", in Proceedings 1997 IEEE International Symposium on Computational Intelligence in Robotics and Automation CIRA'97. 'Towards New Computational Principles for Robotics and Automation' Jul. 10, 1997, pp. 146-151.
Yang et al., "Visual semantic navigation using scene priors", arXiv:1810.06543v1 [cs.CV] Oct. 15, 2018, pp. 1-14.
Hart et al., "A Formal Basis for the Heuristic Determination of Minimum Cost Paths", IEEE Transactions of SYstems Science and Cybernetics, vol. 4, No. 2, Jul. 1968, pp. 1-8.
Siciliano et al., "Springer Handbook of Robotics", Springer-Verlag, Berlin, Heidelberg, Aug. 2008, pp. 1-70.

* cited by examiner

ROBOTIC NAVIGATION AND TRANSPORT OF OBJECTS

RELATED APPLICATION INFORMATION

This application claims priority to U.S. Patent Appl. No. 63/270,615, filed on Oct. 22, 2021, and U.S. Pat. Appl. No. 63/279,328, filed on Nov. 15, 2021, incorporated herein by reference in their entirety.

BACKGROUND

Technical Field

The present invention relates to autonomous navigation and, more particularly, to navigation and transport of objects within an environment.

Description of the Related Art

Robots may be used to perform tasks in internal spaces. Such spaces may be cluttered with objects that impede the robots movement, such as furniture, walls, and debris, and that may further limit the robot's line of sight.

SUMMARY

A navigation method includes building a topological graph of an environment using nodes that represent locations in the space and associated directions, with frontiers associated with particular nodes and directions within the topological graph. An action is determined using a policy trained with an action reward function that weighs exploration to find new objects and moving objects to a goal. An agent navigates within the environment in accordance with the determined action.

A navigation system includes a hardware processor and a memory to store a computer program. When executed by the hardware processor, the computer program causes the hardware processor to build a topological graph of an environment using nodes that represent locations in the space and associated directions, with frontiers associated with particular nodes and directions within the topological graph, to determine an action using a policy trained with an action reward function that weighs exploration to find new objects and moving objects to a goal, and to navigate an agent within the environment in accordance with the determined action.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

A robot tasked with finding and moving objects within an environment may be guided by a topological graph-based exploration framework and atomic policies to perform individual sub-tasks. A high-level planner may be implemented as a finite state machine that selects a next sub-routine to execute from the action set, {Explore, Pickup, Drop}. A topological map representation may include a graph of nodes to infuse geometric and odometry information that facilitates exploration and backtracking. Each node may be divided to aggregate representations from multiple directions in the node's vicinity.

The representation within a specific node and direction may include latent features $\mathcal{F}_A$ from a pre-trained encoder, an exploration score $\mathcal{F}_E$ that captures the likelihood of finding an object if the agent explores a frontier, and an object closeness score $\mathcal{F}_O$ that indicates a distance to an object within the agent's field of view.

This approach to motion planning for an agent helps navigate toward target objects in unknown locations. A modular hierarchical model is used to provide motion planning on long horizons and is adaptable to challenging settings, even when trained on simpler versions of the task.

Figure 1:
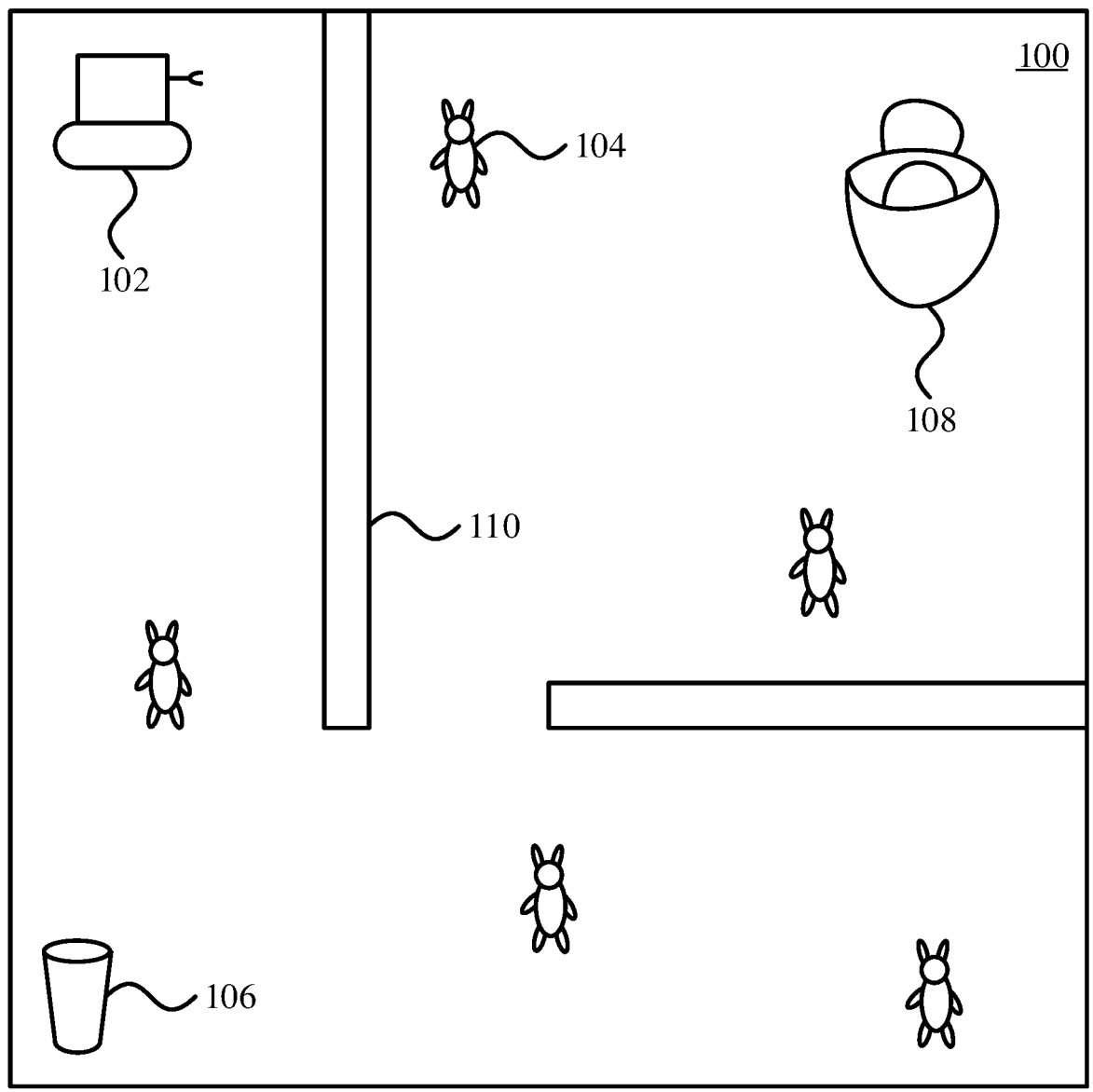
FIG. 1 is a diagram of an interior environment with an agent that navigates the environment to move objects, in accordance with an embodiment of the present invention.

Referring now to FIG. 1, an exemplary environment 100 is shown. An agent, in this case a robot 102, navigates through the environment to perform a task. For example, the environment 100 may represent an indoor environment, such as a warehouse, a hospital, or a home. The agent 102 may have the task of transporting target objects 104 to a specified goal location 106. Toward that end, the agent 102 has structures that allow it to move within the environment 100, for example including wheels or treads and a motor. The agent 102 further has the ability to sense its surroundings within the environment 100, but may not have the ability to sense the entire environment 100 at once. For example, the agent 102 may include one or more of an optical sensor, a depth sensor, an ultrasound sensor, and a sonar sensor. The agent 102 may include a memory and processor that it can use to store information about the environment 100 and to plan its actions within the environment.

The agent 102 may have the ability to interact with objects within the environment 100, for example by picking up or dropping a target object 104. The ability to interact with objects may be constrained, for example by limiting a number of target objects 104 that can be picked up at once. This constraint may be eased, in whole or in part, by picking up a container object 108.

The environment 100 may include a number of obstacles 110. The obstacles 110 are shown herein as walls, but it should be understood that the obstacles 110 may include any type of object or surface that may hinder the agent's actions. For example, an obstacle 110 may be immovable, such that the agent 102 has to find a route around. In another example, an obstacle 110 may be opaque, so that the agent 102 cannot directly obtain information about what lies behind the object 110.

In some examples, the agent 102 is to transport K target objects 104 to the goal location 106. The objects may be any appropriate shape and size that can be manipulated by the agent 102. The agent 102 explores the environment 100 to find the objects 104, without prior knowledge of their coordinates. The agent 102 may perform actions that include turning left, turning right, moving forward, picking up an object, and dropping an object.

The agent 102 may have an egocentric perspective, with pictures being taken in the visual spectrum (e.g., with red, green, and blue channels) and with depth information. The agent 102 may further record odometry information $P_{\phi xy}$ as well as a hand state $O_h$ to track whether the agent 102 is holding a given target object 104 and a goal state $O_g$ to track whether a given target object 104 is already at the goal 106.

If the agent is within a certain distance of any target object 104, e.g., R=1.5 m, and a pickup action is called, the agent may grasp the target object 104 and may update the hand state $O_h$. During simulations, the target object 104 may simply be removed from the environment 100. For a drop action, any objects being held by the agent 102 may be dropped near the agent's location within the environment 100. If the goal 106 is within a certain distance R of the agent 102, the goal state may be updated to include the object.

The agent 102 may have a limit to the number of objects it can hold at once, for example with a constraint of two objects at a time. If the agent 102 picks up the container 108, the constraint may be relaxed to hold a larger limit, or may be removed entirely. In an example, the agent 102 may need to drop any held objects before it can pick up the container 108.

The task may include multiple phases, including searching for, navigating to, and interacting with objects and tracking carrying capacity constraints. Searching and navigation may include reasoning about the environment at various scales, including coarse room connectivity charts over the explored map for planning long trajectories and fine-grained local occupancy maps for object interaction. Sub-task sequences may be selected under uncertainty. For example, having found a target object 104 that is far from the goal 106, the agent 102 may determine whether to immediately drop the target object 104 at the goal 106 or to look for another object to increase efficiency.

Figure 2:
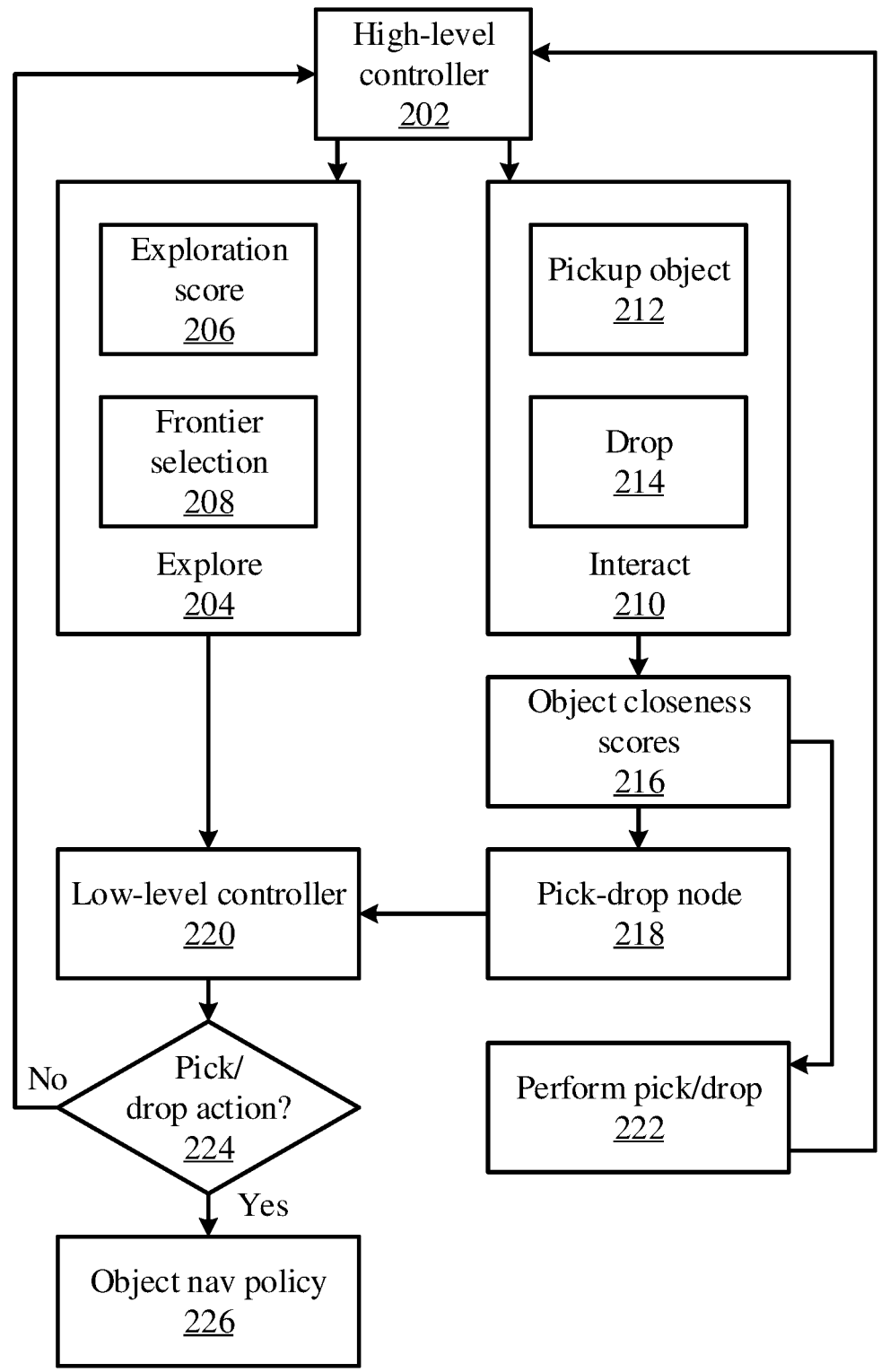
FIG. 2 is a block/flow diagram of a navigation method/system that selects actions to perform and that navigates the agent within the environment to perform a task, in accordance with an embodiment of the present invention.

Referring now to FIG. 2, a modular policy is shown that can be used to build a topological map of the environment 100 and that operates at different levels of temporal abstraction. The framework may include three components: a high-level controller 202, a low-level controller 220, and pick/drop controls. The high-level controller 202 decides on the next high-level action to perform, selected from $\mathcal{A}_H$={Explore, Pickup[object], Drop}. At any point, if the high-level controller 202 determines that a different sub-task should be performed, the current execution may be interrupted. Sub-tasks may include a topological graph builder, an exploration score predicter, an object-closeness predicter, an object navigation policy 226, and a low-level controller 220.

The topological graph builder may be used to create a topological map of an environment as a graph G=(V, E), where $V \in \mathbb{R}^{N_t \times f_d}$ and E represents spatial nodes and connecting edges respectively. The nodes are positioned within a space determined by number of nodes $N_t$ at a timestep t and the length of node features $f_d$. Node features for a node $V_i \in V$ may include concatenated node-direction features $V_{i,\theta}$ corresponding to D=12 directions $\theta \in \{1, \ldots, D\}$ spanning a circle of 360 degrees, centered on the node. The node-direction features $V_{i,\theta}$ may be determined by encoding perspective images through an encoder $\mathcal{F}_A$, which may be pretrained in an autoencoder.

At every timestep t, the graph builder updates the map as follows. Input to the graph builder may include pose information $P_{\phi xy}$ and encoded egocentric image features from $\mathcal{F}_A$. The agent's location $P_{xy}$ is mapped to a nearest existing graph node $V_i$ and its heading angle $P_\phi$ is mapped to the nearest node-direction $\theta$. The corresponding node-direction representation $V_{i,\theta}$ is updated to the image feature vector. A new node $V_{i+1}$ is added if the agent is not within a distance threshold, e.g., $l_{th}$=2 m, of existing nodes, storing the corresponding node coordinate $P_{xy}$. When an agent transitions between two nodes in the graph, the graph is updated to add an edge between the two nodes. The last visited timestep for every node may also be tracked to provide additional context for later processing.

At every node-direction, indexed by (i, $\theta$), aside from the feature vector above, two score predictions may be calculated, including an exploration score 206 for each that predicts the likelihood of finding an object by exploring the frontier and an object closeness score 216 that indicates a distance to various objects in the current field of view.

The exploration score predictor $\mathcal{F}_E$ may have at least two variants. In a first variant, a Q learning-based graph convolutional neural network (GCN) may reason for frontiers over the entire topological graph. In a second variant, a convolutional neural network (CNN) predicts frontier scores on a per-frame basis.

Determining the exploration score using a GCN may operate on the current topological map G and a binary mask $M^{N_t \times \theta_d}$, where $\theta_d$ indicates a direction, for example selected from a set of twelve directions. The binary mask may indicate the availability of a frontier at every node-direction. The GCN may be trained using these inputs to produce reinforcement learning Q-values for each node-direction, representing future rewards for finding objects after visiting each frontier associated with that node-direction. The object-finding reward function $r_t^e$ at every timestep t may be:

$$r_t^e = \mathbb{1}_{success} \cdot r_{success}^e + r_{slack}^e + \sum_o \mathbb{1}_{found}^o \cdot r_{found}^e$$

where $\mathbb{1}_{found}^o$ is an indicator if an object o was found at a timestep t, $r_{found}^e$ is a reward for finding a new object, $r_{slack}^e$ is a time penalty for every step that encourages finding objects faster, $\mathbb{1}_{success}$ is an indicator if all objects were found, and $r_{success}^e$ is an associated success bonus. An object is considered found if it is within the agent's field of view with a distance less than some predetermined distance threshold. The GCN architecture may include three layers of graph convolution layers and a fully connected layer. Thus, the GCN may be trained using the object-finding reward function $r_t^e$ to select a next direction to move in.

Determining the exploration score using a CNN may include computing the exploration score directly from the agent's current view, including visual and depth information. Given the view, a CNN may be used to predict three exploration scores, with each score representing the chances of finding an object if the agent explores the farthest frontier available within a corresponding range of angles, centered on the current agent heading. These angle ranges may include −45° to −15°, −15° to +15°, and +15° to +45°. The CNN may be trained with labels set to max $$\left(\max_o(d_{a,o} - d_{f,o}/5, 0)\right),$$

where $d_{a,o}$, $d_{f,o}$ represent geodesic distances to the object o from the agent and the frontier, respectively. If a frontier is not available, then the score may be set to zero. These three scores may then be stored respectively to three consecutive node directions: θ−1, θ, θ+1, centered on the current direction θ and at the current node i.

An object closeness predictor $\mathcal{F}_O$ may implemented as a CNN to map the current visual observation information I to a closeness score 216 for every object. The object closeness predictor may be trained with supervised learning to predict target closeness labels for each object, which may be set to a max (1−d/5,0), where d is the true distance to the object in meters. In this arrangement, objects farther than 5 m would have labels of zero, while very close objects would have labels approaching one. Each node-direction may have an associated object closeness score for each object.

The object navigation policy 226 selects navigation objects, for example from the action set {Forward, Turn left, Turn right}, given visual observations I and a one-hot encoding $k_o$ of a target object, with the goal of moving the agent closer to the target. The policy 226 may be trained using reinforcement learning with a reward $r_t^n$ at each timestep t using the reward function:

$$r_t^n = \mathbb{1}_{[reached-obj]} \cdot r_{obj}^n + r_{slack}^n + r_{d2o}^n + r_{collision}^n$$

where $\mathbb{1}_{[reached-obj]}$ is an indicator that a target object has been reached, $r_{obj}^n$ is the success reward if the agent reaches closer than a threshold distance $d_{th}$ from the target object, $r_{slack}^n$ is a constant time penalty for each step, $r_{d2o}^n = (d_{t-1} - d_t)$ is the decrease in geodesic distance with the target object and $r_{collision}^n$ is a penalty for collision with an object in the environment. The policy 226 may be trained using proximal policy optimization reinforcement learning. Thus this navigation reward function can be used to train the object navigation policy in simulation, such that given any object of interest the navigation policy can take the agent to that object.

The high-level controller 202 may include feature extraction, for example to accept information about the state of the environment and of the agent and to generate a feature vector that can be used to build the topological graph, to determine object closeness, and to guide actions of the low-level controller 220. For example, an image may be supplied from one or more sensors at the agent, including a picture of a predetermined number of pixels including red, green, blue, and depth information for each pixel. The state information may also include the hand state $O_h$ and the goal state $O_g$. The image may be processed by a neural network, for example including an architecture of three convolutional layers, a rectified linear unit (ReLU) layer and a liner layer, and a ReLU that transforms the input to a feature vector, with an exemplary dimension of 512. The convolutional layers may include kernels with size {8,4,3}, may have strides of {4,2,1}, and may have output channels of {32,64, 32} respectively. The hand state and goal state may pass through dense layers to generate respective feature vectors of exemplary dimension 32. The image features, hand-goal features, and a previous action embedding may be concatenated and passed to a recurrent unit to generate features that can be used to predict actions and the approximate value function.

The low-level navigation controller 220 takes as input a goal location from within the explored regions to be reached. The low-level controller 220 plans a path toward the goal location using any appropriate planning method, for example using a pre-built occupancy map.

A hierarchical transport policy (HTP) manages the flow of control between these components to perform long-horizon transport tasks and other embodied navigation tasks. The high-level controller 202 may be implemented as a finite state machine $\pi^H$. Based on object closeness scores $\mathcal{F}_O$, hand state $O_h$, and goal state $O_g$, the high-level controller 202 selects a sub-task from among $\mathcal{A}_H$={Explore, Pickup [Object], Drop}. These actions are indicated by explore block 204 and interact block 210. The interact block includes actions pickup object 212 and drop 214.

At a timestep t, if the next high-level task predicted by the high-level controller 202 is different from the current sub-task that is being executed, the high-level controller 202 interrupts execution and the agent performs the new high-level action. For example, if the agent finds an object during exploration 204 that has a closeness score higher than some threshold, it may switch control from exploration 204 to picking up 212 the object, assuming the agent's capacity has not been reached.

If the high-level controller 202 selects the exploration sub-task 204, a weighted frontier approach may be used that is based on a predicted exploration score function $\mathcal{F}_E$ in block 206. For every timestep t, the set of frontiers S may be determined over the explored and unexplored regions using occupancy information. When a new frontier is identified, a parent node-direction $Y_r = (i, \theta^n)_r$ is assigned for the $r^{th}$ frontier, where (i, θ) is the current localized node-direction and $\theta^n$ is calculated based on the angle made by the frontier with the agent.

The agent may have a field of view that covers an angular range, such as 90°. The $\theta^n$ for the newly found frontiers can assume one of {θ−1, θ, θ+1} directions. For all existing frontiers from timestep t−1, the same parent-node directions may be copied from the previous timestep. A representative frontier $S^{i,\theta}$ may be designated for node direction (i, θ) as:

$$S^{i,\theta} = \left\{s_k : \arg\min_k \|s_k - X_c\| \forall Y_k = (i, \theta)\right\},$$

where $s_k \in S$ and $X_c$ is the center of frontiers associated with $Y_k = (i, \theta)$.

For frontier selection 208, at each timestep, exploration 204 selects a node-direction (i, θ) from the graph G that has the highest exploration score 206. The corresponding frontier $S^{i,\theta}$ is set as the goal location for the agent's low-level controller 220, and the agent begins to move toward the goal. The highest-score goal frontier may be recomputed at every timestep, and may change as new views are observed during exploration.

Interactions 210 include the actions pickup object 212 and drop 214, which may be selected by the high-level controller 202. When called, a node (i, θ) may be selected as the pick-drop node 218 from the graph G with the highest object closeness score 216 for the target object. If the agent is not already at the selected $i^{th}$ node, then its location $P_{xy}(i)$ is set as the goal for the low-level controller 202. Once the agent is localized to the $i^{th}$ node, it orients in the direction θ. If block 224 determines that there is a pickup or drop action, control then passes to the object navigation policy 226, targeting the object select by the high-level controller 202. When the agent is within a threshold distance of the target object or goal zone, based on object closeness score 216, block 222 performs the pickup or drop action. The sub-task is successful when the hand state or goal state of the agent is changed accordingly and the high-level controller 202 selects a next high-level action to execute. This loop may continue until it performs the pick/drop action 222 or until a maximum number of steps $T_p$ have been taken, after which control may be returned to the high-level controller 202.

Figure 3:
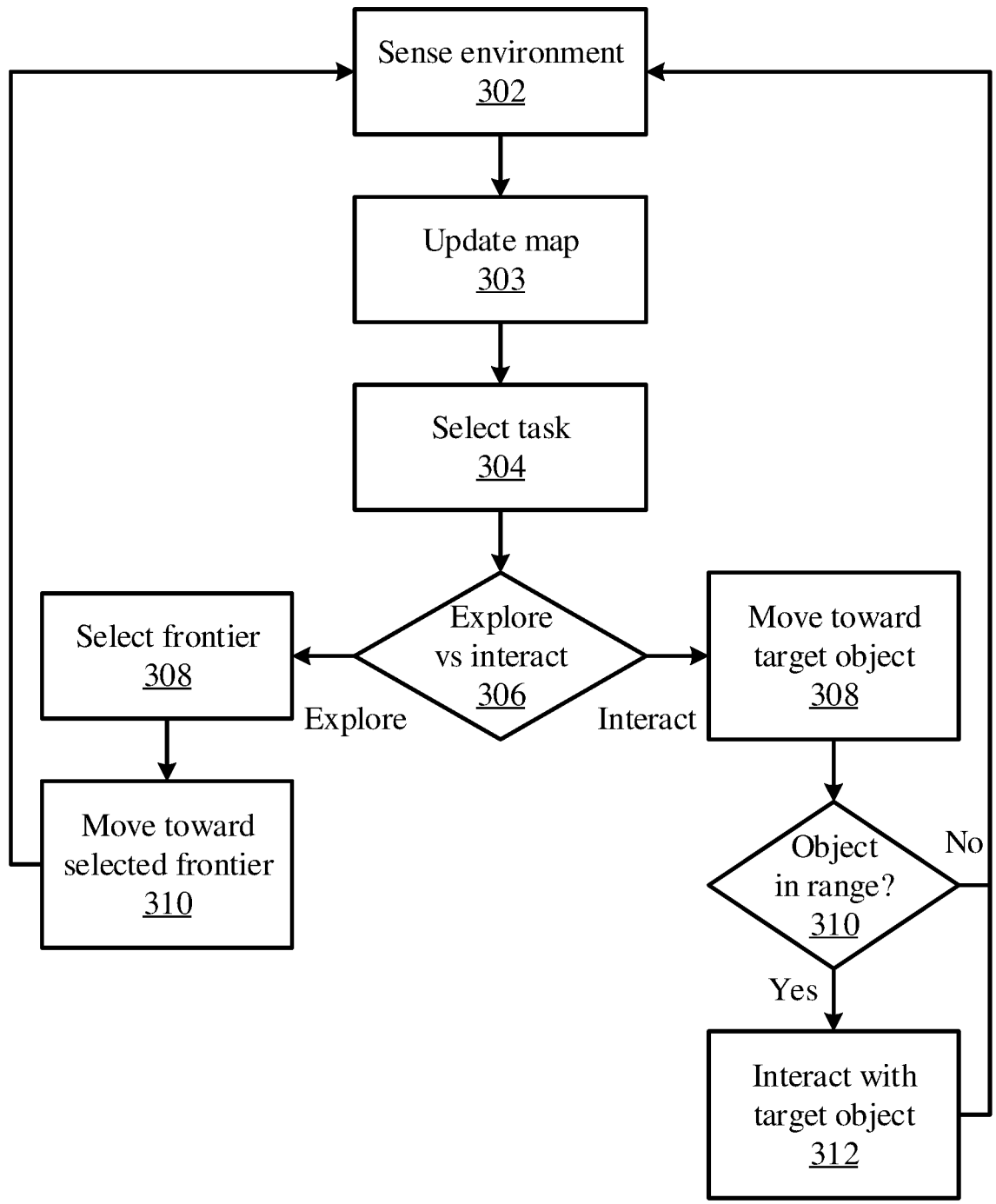
FIG. 3 is a block/flow diagram of a method of determining an action to take by the agent in the environment, in accordance with an embodiment of the present invention.

Referring now to FIG. 3, a method of performing an object retrieval task is shown. Block 302 senses the environment, for example using information supplied by a sensor on a robotic agent. The sensed information may include visual information, for example using a red-green-blue camera, and may further include depth information that is generated by any appropriate sensor. Block 303 uses the sensed information to update a map of the environment, for example adding any information about sensed objects and obstacles to a topological graph G.

Block 304 selects a task to perform, according to a policy of a high-level controller 202. The policy may be trained using reinforcement learning, according to a reward function that balances exploration with performing object retrieval tasks. Constraints on the policy selection may be imposed, for example based on what objects the agent is already holding. Based on the current known state of the environment and any constraints, block 304 selects between exploring the environment and interacting with objects of the environment.

If block 306 determines that an exploration task has been selected, block 308 selects a frontier according to the map of the environment. The frontier may represent an edge of the known area of the topological map, so that moving toward the selected frontier in block 310 will generate new information about the environment.

If block 306 determines that the task is to interact with an object, for example picking up a target object or dropping a held object at a goal object, block 308 will move toward the object. If block 310 determines that the object is in within a threshold distance, then block 312 performs the appropriate action to interact with the object, such as picking up a target object or dropping a held object at a goal object.

The process is iterative—as the agent moves through the environment, block 302 continues to sense new information and applies the new information to the selection of the task 304. Thus, if new information is sensed, block 304 may select a new task that is different from the task currently being performed. For example, a new target object may be discovered during exploration, which may cause block 304 to change tasks to interact with the target object. In that case, the new task may be initiated without completing a previous task. For example, rather than reaching the selected frontier during exploration, the agent may divert to pick up a target object.

Figure 4:
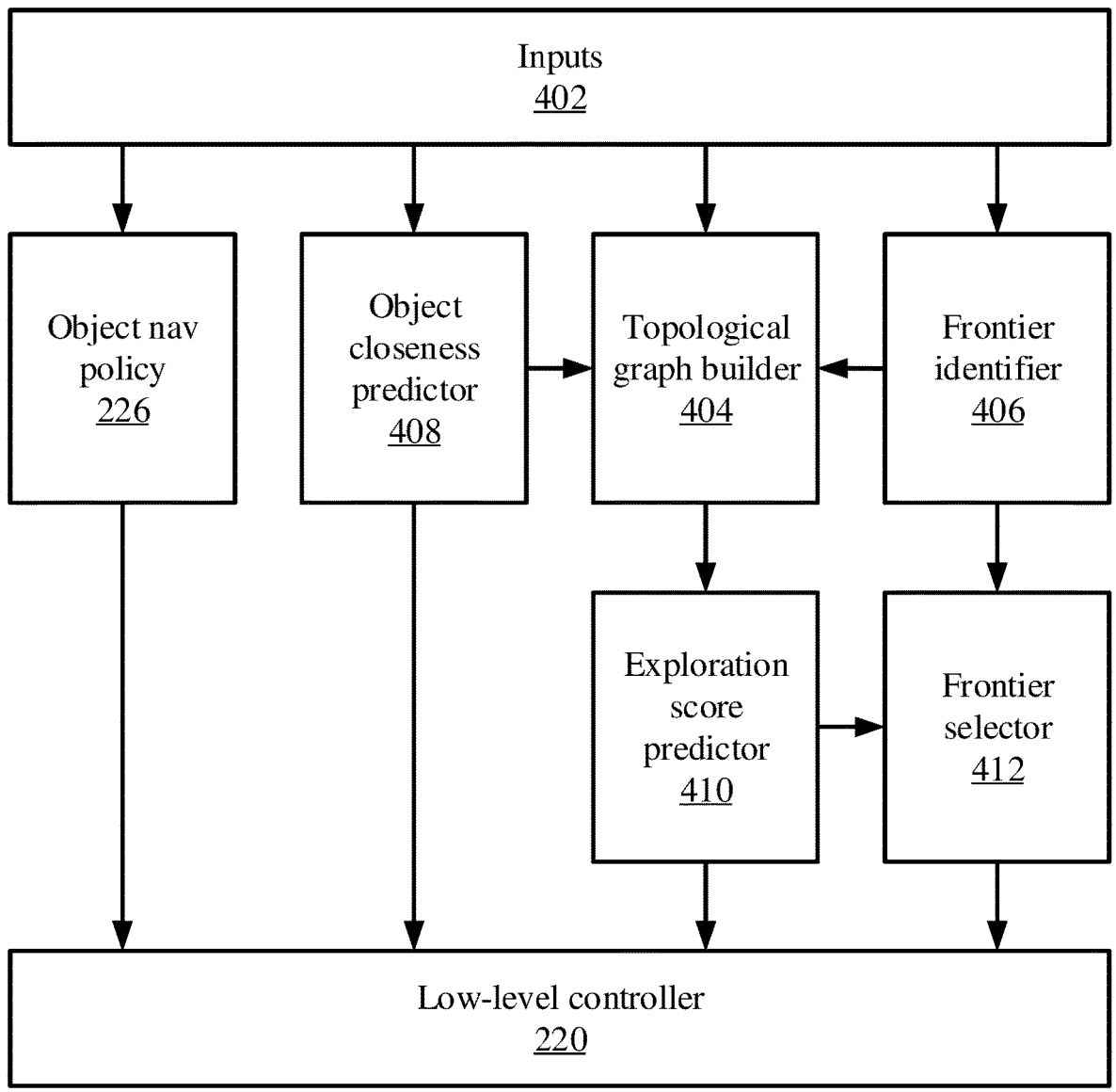
FIG. 4 is a block/flow diagram of the processing of a low-level controller to navigate the agent within the environment, in accordance with an embodiment of the present invention.

Referring now to FIG. 4, additional detail on how information is processed for use by the low-level controller 220 is shown. A set of inputs 402 may include, e.g., visual information from one or more sensors of the agent, hand and goal state information, odometry information representing a path the agent has already taken through the environment, and map information generated by the agent about the information.

A topological graph builder 404 uses the inputs 402 to generate a graph of the environment, for example using information generated by object closeness predictor 408 and frontier identifier 406. The topological graph builder 404 may use a pre-trained encoder $\mathcal{F}_A$, which may be trained as the encoder part of an autoencoder neural network, to convert input visual and odometry information into a vector of nodes, with each element of the vector representing a different node of the graph G. The topological graph builder may further incorporate frontier association information Y and object closeness information $\mathcal{F}_O(i, θ)$ to establish relationships between the nodes of the graph G.

Frontier identification may identify available frontiers, being the boundaries between known and unknown locations on a map of the environment. The frontier points may be associated with the topological graph. Every frontier may include a particular node-direction $V_{i,θ}$, based on a node from which the frontier was discovered and an absolute angle between the node and the frontier.

The object closeness predictor 408 accepts visual information as an input and processes the visual information using a neural network, for example including a convolutional layer and a fully connected layer, to generate a set of closeness scores for each target object in the environment.

The topological graph builder 404 outputs a vector representation of a graph for the environment. The exploration score predictor 410 may accept the graph output and may, for example, use a graph convolutional network to generate a set of Q-values, one for each frontier in the graph. The exploration score predictor 410 may output a vector of exploration scores relating to the respective frontiers of the topological graph. Frontier selector 412 may use the exploration scores to identify a frontier sub-goal, for example by selecting the frontier with the highest Q-value.

An object navigation policy 226 further takes as input the visual information and a selected target object. A convolutional network processes the visual information and may feed its output to a long-short term memory (LSTM) neural network to identify navigational commands. The object navigation policy 226 thereby can use reinforcement learning policies to travel toward semantic targets at unknown locations.

The low-level controller 220 takes instructions from the object navigation policy 226, the exploration score predictor 410, and the frontier selector 412 to execute instructions provided by the high-level controller 202. For example, during an exploration operation, the low-level controller 220 may take information relating to a selected frontier and may maneuver toward that frontier. During that motion, frontier selection may be continually updated using new topological information about the environment. During an object interaction task, the low-level controller 220 may navigate toward a target object or goal object and may perform an appropriate action when the object closeness predictor 408 indicates the object is within range.

Figure 5:
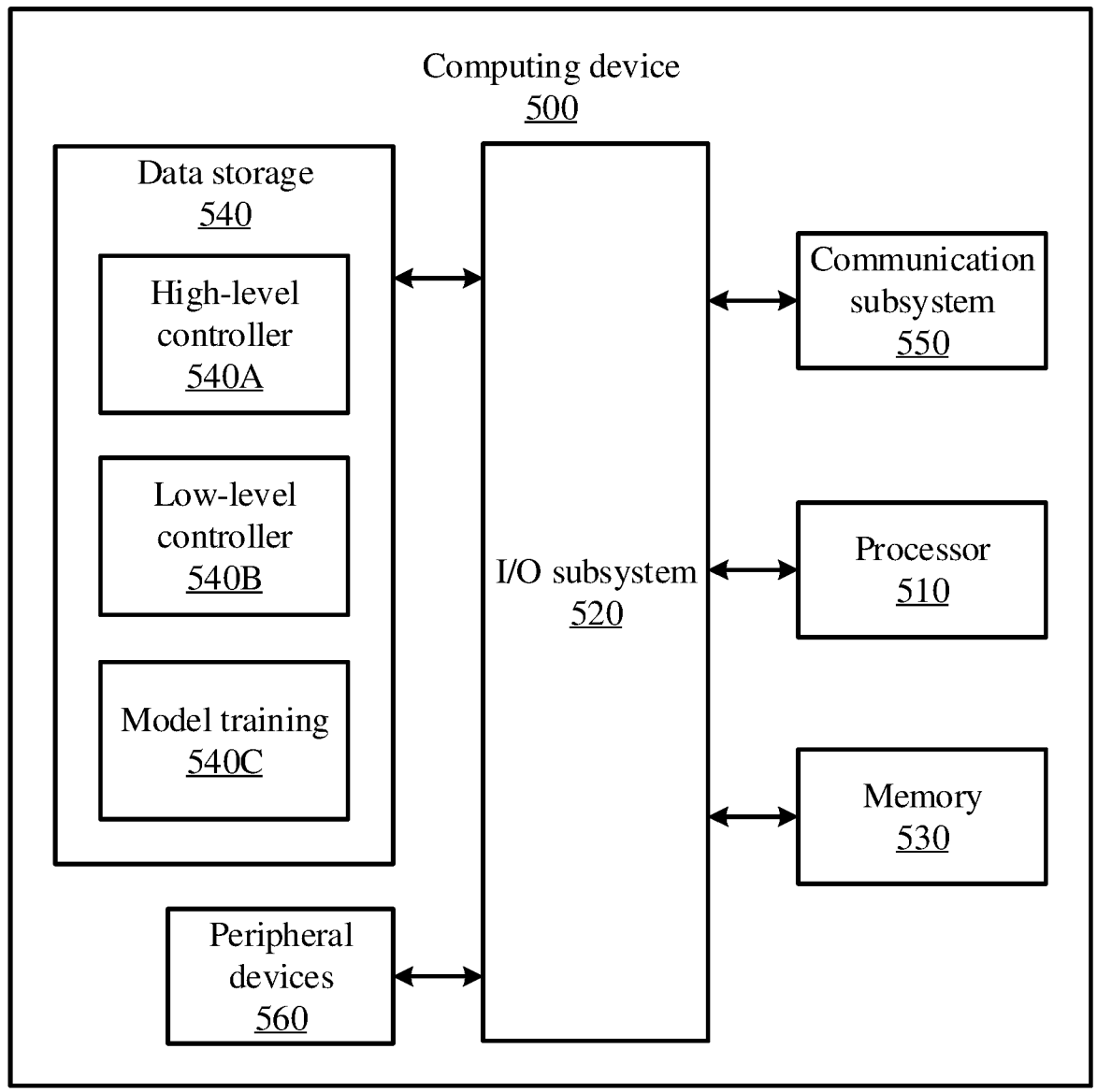
FIG. 5 is a block diagram of a computing device that includes software to act as a high level controller and a low-level controller, and to train the models of the controllers, in accordance with an embodiment of the present invention.

Referring now to FIG. 5, an exemplary computing device 500 is shown, in accordance with an embodiment of the present invention. The computing device 500 is configured to perform classifier enhancement.

The computing device 500 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 500 may be embodied as a one or more compute sleds, memory sleds, or other racks, sleds, computing chassis, or other components of a physically disaggregated computing device.

As shown in FIG. 5, the computing device 500 illustratively includes the processor 510, an input/output subsystem 520, a memory 530, a data storage device 540, and a communication subsystem 550, and/or other components and devices commonly found in a server or similar computing device. The computing device 500 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 530, or portions thereof, may be incorporated in the processor 510 in some embodiments.

The processor 510 may be embodied as any type of processor capable of performing the functions described herein. The processor 510 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 530 may be embodied as any type of volatile or non-volatile memory or data storage capable of performing the functions described herein. In operation, the memory 530 may store various data and software used during operation of the computing device 500, such as operating systems, applications, programs, libraries, and drivers. The memory 530 is communicatively coupled to the processor 510 via the I/O subsystem 520, which may be embodied as circuitry and/or components to facilitate input/output operations with the processor 510, the memory 530, and other components of the computing device 500. For example, the I/O subsystem 520 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 520 may form a portion of a system-on-a-chip (SOC) and be incorporated, along with the processor 510, the memory 530, and other components of the computing device 500, on a single integrated circuit chip.

The data storage device 540 may be embodied as any type of device or devices configured for short-term or long-term storage of data such as, for example, memory devices and circuits, memory cards, hard disk drives, solid state drives, or other data storage devices. The data storage device 540 can store program code 540A for performing high-level control, 540B for performing low-level control, and 540C for training the models used for the high-level controller 540A and the low-level controller 540B. The communication subsystem 550 of the computing device 500 may be embodied as any network interface controller or other communication circuit, device, or collection thereof, capable of enabling communications between the computing device 500 and other remote devices over a network. The communication subsystem 550 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 500 may also include one or more peripheral devices 560. The peripheral devices 560 may include any number of additional input/output devices, interface devices, and/or other peripheral devices. For example, in some embodiments, the peripheral devices 560 may include a display, touch screen, graphics circuitry, keyboard, mouse, speaker system, microphone, network interface, and/or other input/output devices, interface devices, and/or peripheral devices.

Of course, the computing device 500 may also include other elements (not shown), as readily contemplated by one of skill in the art, as well as omit certain elements. For example, various other sensors, input devices, and/or output devices can be included in computing device 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 500 are readily contemplated by one of ordinary skill in the art given the teachings of the present invention provided herein.

Figure 6:
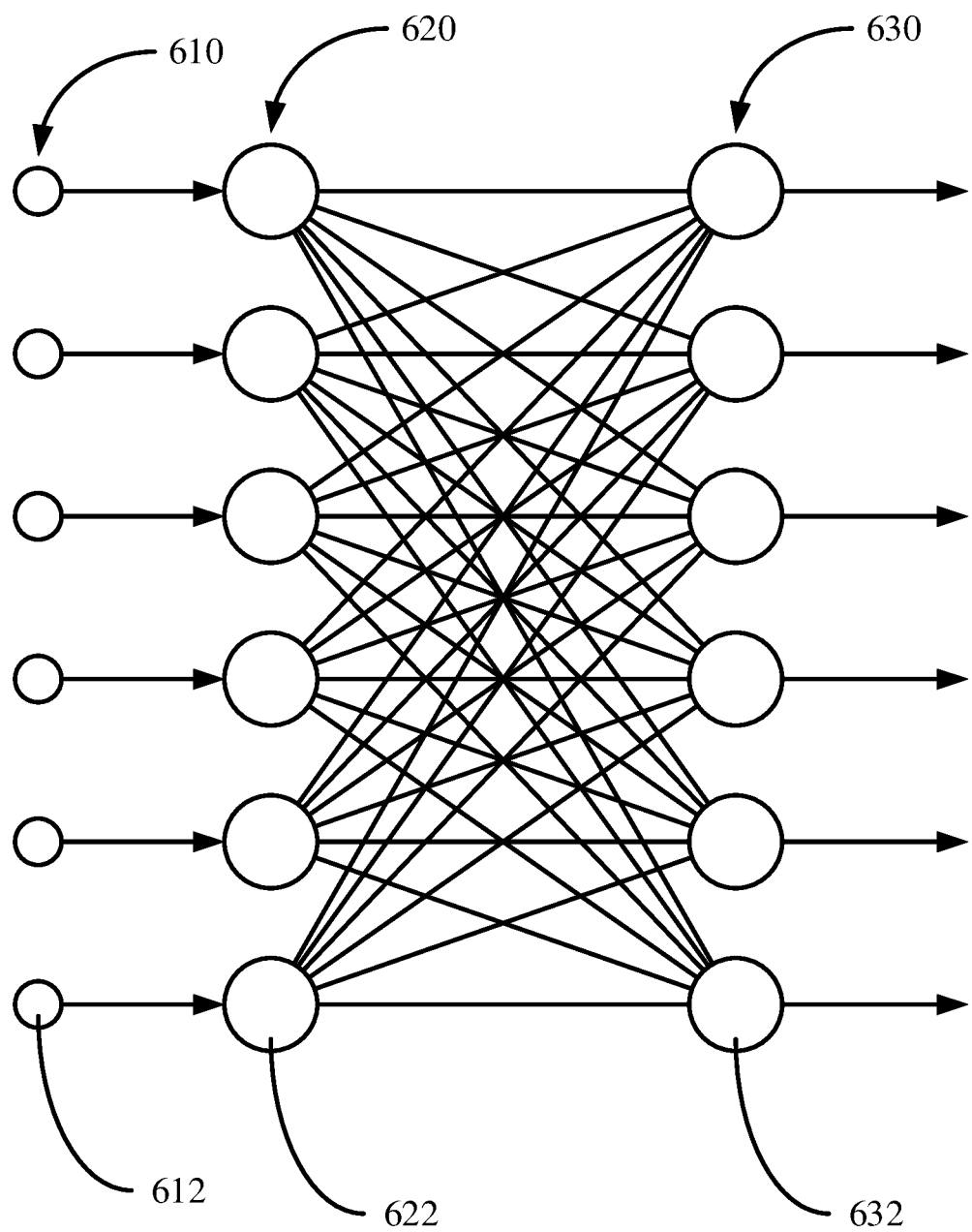
FIG. 6 is a diagram of an exemplary neural network architecture that can be used to implement navigational policies of an agent in an environment, in accordance with an embodiment of the present invention.
Figure 7:
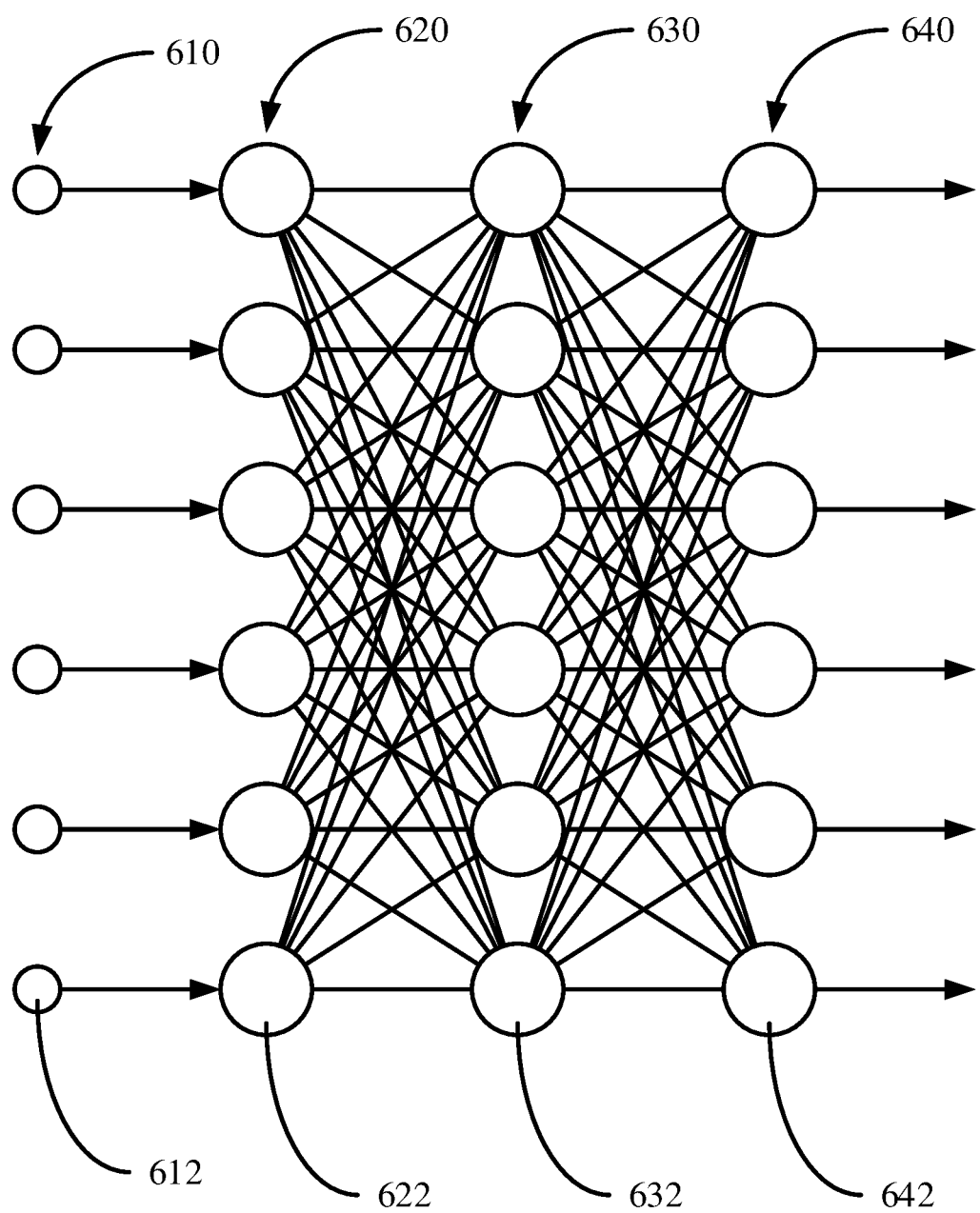
FIG. 7 is a diagram of an exemplary deep neural network architecture that can be used to implement navigational policies of an agent in an environment, in accordance with an embodiment of the present invention.

Referring now to FIGS. 6 and 7, exemplary neural network architectures are shown, which may be used to implement parts of the present models. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 620 of source nodes 622, and a single computation layer 630 having one or more computation nodes 632 that also act as output nodes, where there is a single computation node 632 for each possible category into which the input example could be classified. An input layer 620 can have a number of source nodes 622 equal to the number of data values 612 in the input data 610. The data values 612 in the input data 610 can be represented as a column vector. Each computation node 632 in the computation layer 630 generates a linear combination of weighted values from the input data 610 fed into input nodes 620, and applies a non-linear activation function that is differentiable to the sum. The exemplary simple neural network can perform classification on linearly separable examples (e.g., patterns).

A deep neural network, such as a multilayer perceptron, can have an input layer 620 of source nodes 622, one or more computation layer(s) 630 having one or more computation nodes 632, and an output layer 640, where there is a single output node 642 for each possible category into which the input example could be classified. An input layer 620 can have a number of source nodes 622 equal to the number of data values 612 in the input data 610. The computation nodes 632 in the computation layer(s) 630 can also be referred to as hidden layers, because they are between the source nodes 622 and output node(s) 642 and are not directly observed. Each node 632, 642 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 632 in the one or more computation (hidden) layer(s) 630 perform a nonlinear transformation on the input data 612 that generates a feature space. The classes or categories may be more easily separated in the feature space than in the original data space.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A navigation method, comprising:
    building a topological graph of an environment using nodes that represent locations in the space and associated directions, with frontiers associated with particular nodes and directions within the topological graph;
    determining an action using a policy trained with an action reward function that weighs exploration to find new objects and moving objects to a goal, including calculating an exploration score that represents a likelihood of finding an object upon exploring a frontier and predicting frontier scores on a per-frame basis using a convolutional neural network; and
    navigating an agent within the environment in accordance with the determined action.

2. The method of claim 1, wherein calculating the exploration score includes calculating a respective exploration score for each node-direction combination in the topological graph.

3. The method of claim 1, wherein calculating the exploration score includes processing the topological graph using a graph convolutional neural network.

4. The method of claim 1, wherein determining the action selects an action from the group consisting of explore, pickup, and drop and wherein the pickup and drop actions interact with a target object to move the target object from an origin location to a goal location.

5. The method of claim 1, wherein the agent is an autonomous device and navigating the agent causes the agent to move within the environment.

6. The method of claim 1, wherein the action reward function is expressed as:

$$r_t^e = \mathbb{I}_{success} \cdot r_{success}^e + r_{slack}^e + \sum_o \mathbb{I}_{found}^o \cdot r_{found}^e$$

where $\mathbb{I}_{found}^o$ found is an indicator if an object o was found at a timestep t, $r_{found}^e$ is a reward for finding a new object, $r_{slack}^e$ is a time penalty for every step that encourages finding objects faster, $\mathbb{I}_{success}$ is an indicator if all objects were found, and $r_{success}^e$ is an associated success bonus.

7. The method of claim 1, wherein navigating includes using a navigation policy trained with a navigation reward function that weighs distances to objects.

8. The method of claim 7, wherein the navigation reward function is expressed as:

$$r_t^n = \mathbb{I}_{[reached-obj]} r_{obj}^n + r_{slack}^n + r_{d2o}^n + r_{collision}^n$$

where $\mathbb{I}_{[reached-obj]}$ is an indicator that a target object has been reached, $r_{obj}^n$ is the success reward if the agent reaches closer than a threshold distance $d_{th}$ from the target object, $r_{slack}^n$ is a constant time penalty for each step, $r_{d2o}^n = (d_{t-1} - d_t)$ is the decrease in geodesic distance with the target object and $r_{collision}^n$ is a penalty for collision with an object in the environment.

9. The method of claim 1, further comprising using the exploration score to identify a frontier sub-goal.

10. The method of claim 1, further comprising using an object closeness score to indicate a distance to an object within the agent's field of view.

11. A navigation system, comprising:
    a hardware processor; and
    a memory to store a computer program that, when executed by the hardware processor, causes the hardware processor to:
        build a topological graph of an environment using nodes that represent locations in the space and associated directions, with frontiers associated with particular nodes and directions within the topological graph;
        determine an action using a policy trained with an action reward function that weighs exploration to find new objects and moving objects to a goal and calculates an exploration score that represents a likelihood of finding an object upon exploring a frontier using a convolutional neural network to predict frontier scores on a per-frame basis; and
        navigate an agent within the environment in accordance with the determined action.

12. The system of claim 11, wherein the calculation of the exploration score includes a respective exploration score for each node-direction combination in the topological graph.

13. The system of claim 11, wherein the calculation of the exploration score includes a graph convolutional neural network to process the topological graph.

14. The system of claim 11, wherein the computer program further causes the hardware processor to select an action from the group consisting of explore, pickup, and drop, and wherein the pickup and drop actions interact with a target object to move the target object from an origin location to a goal location.

15. The system of claim 11, wherein the agent is an autonomous device and navigating the agent causes the agent to move within the environment.

16. The system of claim 11, wherein the action reward function is expressed as:

$$r_t^e = \mathbb{I}_{success} \cdot r_{success}^e + r_{slack}^e + \sum_o \mathbb{I}_{found}^o \cdot r_{found}^e$$

where $\mathbb{I}_{found}^o$ is an indicator if an object $o$ was found at a timestep t, $r_{found}^e$ is a reward for finding a new object, $r_{stack}^e$ is a time penalty for every step that encourages finding objects faster, $\mathbb{I}_{success}$ is an indicator if all objects were found, and $r_{success}^e$ is an associated success bonus.

17. The system of claim 11, wherein navigating includes using a navigation policy trained with a navigation reward function that weighs distances to objects.

18. The system of claim 17, wherein the navigation reward function is expressed as:

$$r_t^n = \mathbb{I}_{[reached-obj]} \cdot r_{obj}^n + r_{slack}^n + r_{d2o}^n + r_{collision}^n$$

where $\mathbb{I}_{[reached-obj]}$ is an indicator that a target object has been reached, $r_{obj}^n$ is the success reward if the agent reaches closer than a threshold distance $d_{th}$ from the target object, $r_{slack}^n$ is a constant time penalty for each step, $r_{d2o}^n = (d_{t-1} - d_t)$ is the decrease in geodesic distance with the target object and $r_{collision}^n$ is a penalty for collision with an object in the environment.

19. The system of claim 11, wherein the exploration score is used to identify a frontier sub-goal.

20. The system of claim 11, wherein an object closeness score is used to indicate a distance to an object within the agent's field of view.

* * * * *